(12) United States Patent
Lee et al.

(10) Patent No.: US 12,351,058 B2
(45) Date of Patent: Jul. 8, 2025

(54) METHOD FOR BATTERY MANAGEMENT AND BATTERY SYSTEM PROVIDING THE SAME

(71) Applicant: LG ENERGY SOLUTION, LTD., Seoul (KR)

(72) Inventors: Sangki Lee, Daejeon (KR); Bong Keun Kwon, Daejeon (KR); Jong Cheol Lee, Daejeon (KR); Jaehwan Lim, Daejeon (KR); Jandi Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 630 days.

(21) Appl. No.: 17/769,866

(22) PCT Filed: Jul. 8, 2021

(86) PCT No.: PCT/KR2021/008740
§ 371 (c)(1),
(2) Date: Apr. 18, 2022

(87) PCT Pub. No.: WO2022/014953
PCT Pub. Date: Jan. 20, 2022

(65) Prior Publication Data
US 2022/0388417 A1    Dec. 8, 2022

(30) Foreign Application Priority Data

Jul. 15, 2020 (KR) .................. 10-2020-0087773

(51) Int. Cl.
*H02J 7/00* (2006.01)
*B60L 53/10* (2019.01)
(Continued)

(52) U.S. Cl.
CPC ............... *B60L 53/62* (2019.02); *B60L 53/11* (2019.02); *B60L 58/12* (2019.02)

(58) Field of Classification Search
USPC ........................................................ 320/132
See application file for complete search history.

(56) References Cited

U.S. PATENT DOCUMENTS 9,969,293 B2    5/2018 Hammoud et al.
2010/0030416 A1  2/2010 Jinno
(Continued)

FOREIGN PATENT DOCUMENTS

CN    101468610 A    7/2009
CN    102856601 A    1/2013
(Continued)

OTHER PUBLICATIONS

Machine Translation of JP-2010201987-A (Year: 210).*
(Continued)

*Primary Examiner* — Samuel Berhanu
(74) *Attorney, Agent, or Firm* — Birch, Stewart, Kolasch & Birch, LLP (57) ABSTRACT

A battery system includes: a battery and a battery management system (BMS) for controlling charging of the battery depending on a normal mode using a first battery capacity between a first lower limit state of charge (SOC) and a first upper limit SOC or an eco-friendly mode using a second battery capacity between a second lower limit SOC and a second upper limit SOC, the first lower limit SOC is smaller than the second lower limit SOC, and the first upper limit SOC is greater than the second upper limit SOC.

11 Claims, 4 Drawing Sheets

(51) Int. Cl.
  *B60L 53/62* (2019.01)
  *B60L 58/12* (2019.01)

(56) References Cited

U.S. PATENT DOCUMENTS

| | | | |
|---|---|---|---|
| 2011/0156652 | A1 | 6/2011 | Kishiyama et al. |
| 2012/0200257 | A1 | 8/2012 | Schwarz et al. |
| 2012/0283902 | A1 | 11/2012 | Kusumi et al. |
| 2013/0124029 | A1 | 5/2013 | Izumi |
| 2013/0162218 | A1 | 6/2013 | Kang et al. |
| 2014/0247019 | A1 | 9/2014 | Park |
| 2014/0303818 | A1* | 10/2014 | Aoki ............... B60W 20/15 903/903 |
| 2016/0039307 | A1 | 2/2016 | Okamura |
| 2017/0028980 | A1 | 2/2017 | Ogawa et al. |
| 2020/0406782 | A1 | 12/2020 | Brunet et al. |
| 2021/0155218 | A1 | 5/2021 | Higuchi et al. |

FOREIGN PATENT DOCUMENTS

| | | |
|---|---|---|
| CN | 105818705 A | 8/2016 |
| EP | 2 340 960 A2 | 7/2011 |
| EP | 3 124 302 A2 | 2/2017 |
| JP | 2000-134719 A | 5/2000 |
| JP | 2005-312224 A | 11/2005 |
| JP | 4241837 B2 | 3/2008 |
| JP | 2010-110187 A | 5/2010 |
| JP | 2010-201987 A | 9/2010 |
| JP | 2012-29455 A | 2/2012 |
| JP | 5310855 B2 | 10/2013 |
| JP | 2014-143815 A | 8/2014 |
| JP | 2014-147197 A | 8/2014 |
| JP | 2014-171380 A | 9/2014 |
| JP | 2019-30161 A | 2/2018 |
| JP | 5877360 B2 | 3/2018 |
| KR | 10-1512879 B1 | 4/2015 |
| KR | 10-1747581 B1 | 6/2017 |
| KR | 10-1592742 B1 | 2/2018 |
| KR | 10-1826617 B1 | 2/2018 |
| KR | 10-1622194 B1 | 5/2018 |
| WO | WO 2017/042973 A1 | 3/2017 |
| WO | WO2019/116586 A | 8/2019 |
| WO | WO2019/120570 A1 | 8/2019 |

OTHER PUBLICATIONS

Extended European Search Report for European Application No. 21842305.1, dated Dec. 20, 2022.
International Search Report (PCT/ISA/210) issued in PCT/KR2021/008740. dated Nov. 2, 2021.

* cited by examiner

METHOD FOR BATTERY MANAGEMENT AND BATTERY SYSTEM PROVIDING THE SAME

TECHNICAL FIELD

Cross-Reference With Related Application(s)

This application claims priority to and the benefit of Korean Patent Application No. 10-2020-0087773, filed in the Korean Intellectual Property Office on Jul. 15, 2020, the entire contents of which are incorporated herein by reference.

The present invention relates to a battery management method and a battery system for providing the same, capable of extending cycle-life of a battery.

BACKGROUND ART

An electric vehicle (EV) is a vehicle that uses an electric battery and an electric motor without using petroleum fuel and an engine. Such electric vehicles include pure electric vehicles (EVs) that run only with batteries and electric motors, hybrid electric vehicles (HEVs), and plug-in hybrid electric vehicles (PHEVs).

The electric vehicle mainly uses a lithium ion battery as a battery, and a 400 V driving battery and a 12 V auxiliary battery may be installed. The electric vehicles that are recently mass-produced and distributed in the market may travel up to 350 km on a single full charge (e.g., the Chevrolet Bolt EV), and this varies greatly depending on a vehicle type. Various modules/devices for user convenience in an electric vehicle consume power when driving, and thus may affect a mileage of the electric vehicle.

As a charging method for batteries, slow charging and rapid charging methods are selectively used. For such a charging time, it is known that slow charging takes 4 to 9 h and rapid charging takes 30 min to 1 h, and with development of battery technology, slow charging or fast charging speed is being improved. A charger charges electrical energy by connecting a charging cable to a charging terminal of an electric vehicle, and typically supports a high-speed or low-speed charging type.

In the meanwhile, after a predetermined period of time elapses, for example, when a predetermined number of charge or discharge cycles is reached, a battery capable of charging and discharging rapidly deteriorates in performance and needs to be replaced. In particular, such a replacement period of the battery may be shortened or lengthened depending on a usage pattern of a user. For example, there are many research results showing that the cycle-life of the battery is shortened as a number of 100% charging and discharging increases or as a number of times of charging by the rapid charging method rather than slow charging increases.

A ratio of a battery to the cost of an electric vehicle (EV) is about 40%, which is very large. When the cycle-life of the battery is shortened as aging is accelerated as overcharge or over-discharge of the battery is repeated, a problem arises that a replacement cost of the battery increases. This may act as a burden when a user purchases an electric vehicle (EV), and may eventually become an obstacle to each country's policy of environmental protection by expanding a number of electric vehicles.

Accordingly, there is a need for a method capable of extending the cycle-life of the battery depending on an environment in which the electric vehicle is used, a user's tendency, and the like.

The above information disclosed in this Background section is only for enhancement of understanding of the background of the invention, and therefore, it may contain information that does not form the prior art that is already known in this country to a person of ordinary skill in the art.

DISCLOSURE

Technical Problem

The present invention has been made in an effort to provide a battery management method and a battery system for provides the same, capable of reducing a usable battery capacity, and charging a battery with a slow charging method when an eco-friendly mode (ECO MODE) is on.

Technical Solution

A feature of the present invention provides a battery system including: a battery; and a battery management system (BMS) configured to control charging of the battery depending on a normal mode using a first battery capacity between a first lower limit state of charge (SOC) and a first upper limit SOC or an eco-friendly mode using a second battery capacity between a second lower limit SOC and a second upper limit SOC, wherein the first lower limit SOC is smaller than the second lower limit SOC, and the first upper limit SOC is greater than the second upper limit SOC.

The BMS may calculate a current SOC by estimating a SOC of the battery every predetermined period, and in an on state of the eco-friendly mode, may start charging of the battery when the current SOC reaches the second lower limit SOC and may end the charging of the battery when the current SOC reaches the second upper limit SOC.

The BMS, in an on state of the eco-friendly mode, may disable a rapid charging method of charging the battery such that the current SOC reaches the second upper limit SOC within a predetermined reference time, and may control charging of the battery by using a slow charging method of charging the battery such that the current SOC reaches the second upper limit SOC after exceeding a predetermined reference time.

The BMS, in an on state of the normal mode, may calculate a current SOC by estimating a SOC of the battery every predetermined period, and may start charging of the battery when the current SOC reaches the first lower limit SOC and may end the charging of the battery when the current SOC reaches the first upper limit SOC.

The BMS, in an on state of the normal mode, may control charging of the battery by using a rapid charging method of charging the battery such that the current SOC reaches the first upper limit SOC within a predetermined reference time or perform a slow charging method of charging the battery such that the current SOC reaches the first upper limit SOC after exceeding a predetermined reference time.

The BMS, in an on state of the normal mode, may control the charging of the battery by the rapid charging method or the slow charging method depending on driver selection.

The BMS may determine that the eco-friendly mode is in an on state when receiving a key-on signal of the eco-mode depending on driver selection, and determining that the normal mode is in an on state when receiving a key-off signal of the eco-friendly mode depending on the driver selection.

Another feature of the present invention provides a battery management method for a battery management system (BMS) to manage a battery by controlling charging of the battery depending on a normal mode using a first battery capacity between a first lower limit state of charge (SOC) and a first upper limit SOC or an eco-friendly mode using a second battery capacity between a second lower limit SOC and a second upper limit SOC, the method including: determining whether the eco-friendly mode (ECO MODE) is in an on state; starting and controlling the charging of the battery when a current SOC that is estimated every predetermined period reaches the first lower limit SOC or the second lower limit SOC depending on a determination result thereof; and ending the charging of the battery when the current SOC reaches the first upper limit SOC or the second upper limit SOC, wherein the first lower limit SOC is smaller than the second lower limit SOC and the first upper limit SOC is greater than the second upper limit SOC.

The starting and controlling of the charging of the battery may include: diagnosing whether or not the current SOC reaches the second lower limit SOC when the eco-friendly mode is in an on state as a result of the determination; starting the charging of the battery by using a slow charging method of charging the battery such that the current SOC reaches the second upper limit SOC after exceeding a predetermined reference time when reaching it as a result of the diagnosis; and diagnosing whether the current SOC reaches the second upper limit SOC.

The starting and controlling of the charging of the battery may include: diagnosing whether or not the current SOC reaches the first lower limit SOC when the normal mode is in an on state as a result of the determination; starting the charging of the battery by using a rapid charging method of charging the battery such that the current SOC reaches the first upper limit SOC within a predetermined reference time or a slow charging method of charging the battery such that the current SOC reaches the first upper limit SOC after exceeding a predetermined reference time when reaching it as a result of the diagnosis; and diagnosing whether the current SOC reaches the first upper limit SOC.

The starting of the charging of the battery may include controlling the charging of the battery by the rapid charging method or the slow charging method depending on driver selection.

The determining of whether the eco-friendly mode (ECO MODE) is in the on state may include determining that the eco-friendly mode is in an on state when receiving a key-on signal of the eco-mode depending on driver selection, and determining that the normal mode is in an on state when receiving a key-off signal of the eco-friendly mode depending on the driver selection.

Advantageous Effects

According to the present invention, it is possible to extend a cycle-life of a battery by reducing use of upper and lower limit SOCs of a usable battery capacity and a number of rapid charges, which accelerates aging of the battery.

According to the present invention, it is possible to reduce a number of charges by using a maximum available battery capacity, and to increase user satisfaction by enabling a user to select a normal mode, which provides convenience in using a battery with a short charging time, and an eco-friendly mode, which extends a cycle-life of the battery, depending on a situation.

MODE FOR INVENTION

In an embodiment, an electric vehicle indicates any vehicle that includes a battery and an electric motor for driving a wheel by using electricity charged in the battery. Such electric vehicles include electric vehicles (EVs) as well as plug-in hybrid electric vehicles (PHEVs). The electric vehicle may charge a battery with power supplied from a charging device that is electric vehicle supply equipment. The charging device may include a quick charger (or fast charger), a slow charging stand that supplies AC power in public places, and a home charger that is simply installed at home or at work to supply AC power.

Hereinafter, embodiments disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers (e.g., natural numbers) such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. On the other hand, it is to be understood that when one component is referred to as being "connected or coupled directly" to another component, it may be connected to or coupled to the other component without another component intervening therebetween.

It will be further understood that terms "comprises/includes" or "have" used in the present specification specify the presence of stated features, numerals, steps, operations, components, parts, or a combination thereof, but do not preclude the presence or addition of one or more other features, numerals, steps, operations, components, parts, or a combination thereof.

Figure 1:
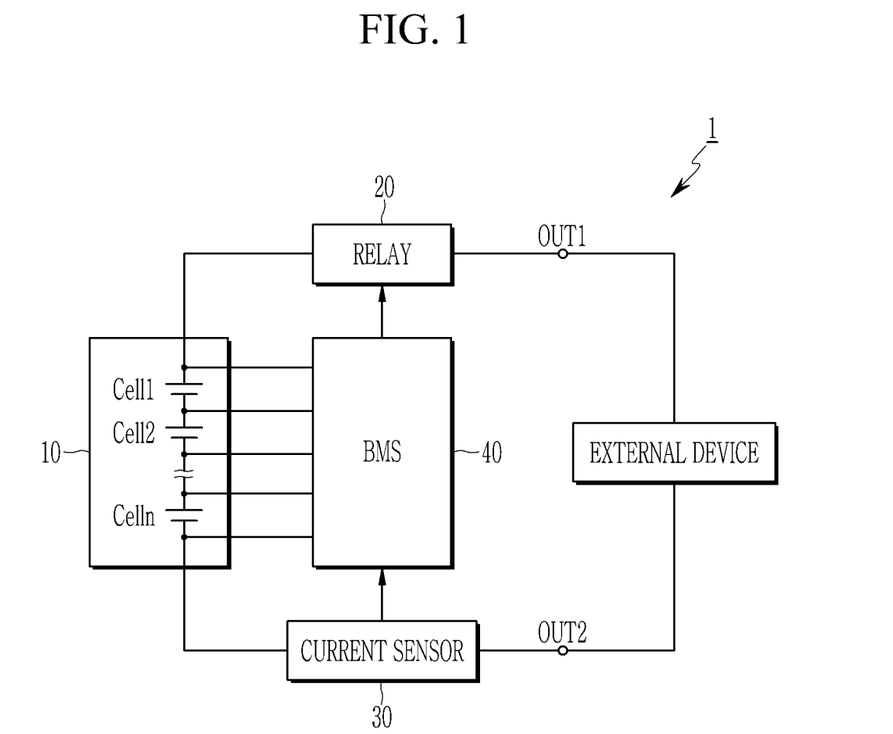
FIG. 1 illustrates a battery system according to an embodiment.

FIG. 1 illustrates a battery system according to an embodiment.

Referring to FIG. 1, the battery system 1 includes a battery 10, a relay 20, a current sensor 30, and a battery management system (BMS) 40.

The battery 10 includes a plurality of battery cells Cell1 to Celln that are electrically connected. In some embodiments, the battery cells may be rechargeable batteries. A predetermined number of battery cells may be connected in series to constitute a battery module, and a predetermined number of battery modules may be connected in series and parallel to constitute the battery 10 to supply desired power. Each of the battery cells Cell1 to Celln is electrically connected to the BMS 40 through wires.

In FIG. 1, the battery 10 includes the plurality of battery cells Cell1 to Celln connected in series, and is connected between two output terminals OUT1 and OUT2 of the battery system 1. The relay 20 is connected between a positive electrode of the battery 10 and the output terminal OUT1, and the current sensor 30 is connected between a negative electrode of the battery 10 and the output terminal OUT2. The constituent elements illustrated in FIG. 1 and a connection relationship between the constituent elements are examples, and the present invention is not limited thereto.

The relay 20 controls electrical connection between the battery system 1 and an external device. When the relay 20 is turned on, the battery system 1 and the external device are electrically connected to perform charging or discharging, and when the relay 20 is turned off, the battery system 1 and the external device are electrically separated. In this case, the external device may serve as a charger in a charging mode in which the battery 10 is charged by supplying power, or a load in a discharge mode in which power stored in the battery 10 is discharged.

The current sensor 30 is connected in series to a current path between the battery 10 and the external device. The current sensor 30 may measure a current flowing through the battery 10, i.e., a charging current and a discharging current, and may transmit a measurement result to the BMS 40.

The BMS 40 may collect and analyze various information related to the battery cells Cell1 to Celln to control charging and discharging of the battery cells, cell balancing, a protection operation, and the like, and may control an operation of the relay 20. For example, the BMS 40 may control charging of the battery 10 in a normal mode (NORMAL MODE) or an eco-friendly mode (ECO MODE) depending on user selection.

In the normal mode (NORMAL MODE), the battery 10 uses a maximum usable battery capacity (hereinafter, a first battery capacity) within a designed range, and uses a charging method selected by a user among a slow charging method or a rapid charging method to charge the battery 10. For example, the normal mode (NORMAL MODE) is a method of using and managing the battery 10 in an initially designed state.

In the eco-friendly mode (ECO MODE), the battery 10 uses a narrower battery capacity (hereinafter, second battery capacity) than the maximum usable battery capacity in a designed range, and charges the battery 10 by a slow charging method. For example, the eco-friendly mode (ECO MODE) is a battery management method for extending the cycle-life of the battery 10, and may be set by user selection. That is, the eco-friendly mode (ECO MODE) is a battery management method that slows down an aging rate of the battery 10 by limiting excessive use of the battery capacity and the rapid charging method.

A state of charge (SOC) is an amount of energy that is currently stored in the battery 10, and a unit thereof is percent (%). When the battery 10 is fully charged, the state of charge SOC is 100%. When the battery 10 is completely discharged, the state of charge (SOC) is 0%. When the fully charged battery 10 starts to be discharged, the state of charge (SOC) decreases to 100%, 80%, 60%, etc. as time elapses. In the meantime, the state of charge (SOC) cannot be directly measured, and the BMS 40 may estimate the state of charge (SOC) by an indirect method such as a conventionally known current integration method or a voltage measurement method. The BMS 40 may estimate the state of charge (SOC) in a predetermined period or in real time.

The battery capacity is a total amount of energy that the battery 10 can store, and the unit is ampere-hours (Ah) and represents how long a constant current can flow. For example, when a current of 1 A flows for 1 hour, the battery capacity is 1 AH, and when it flows for 2 hours, the battery capacity is 2 AH.

According to an embodiment, the first battery capacity may include a battery capacity having a range between a first lower limit SOC and a first upper limit SOC provided in a design and production process of the battery 10. For example, the first battery capacity may include a battery capacity defined as 0% to 100%, or substantially in a range of 2% to 96% in consideration of a design margin, resistance, calculation error, and the like. The second battery capacity may include a battery capacity in a narrower region than the first battery capacity in order to slow the aging rate of the battery 10. Specifically, the second battery capacity may include a battery capacity having a range between a second lower limit SOC that is a predetermined magnitude that is greater than the first lower limit SOC and a second upper limit SOC that is a predetermined magnitude that is smaller than the first upper limit SOC. For example, the second battery capacity may include a battery capacity defined as a range between 30% and 80%.

In the normal mode (NORMAL MODE), the BMS 40 enters a charging mode for supplying power to the battery 10 when the state of charge (SOC) reaches the first lower limit SOC (e.g., 2%). When a real-time state of charge (SOC) reaches the first upper limit SOC (e.g., 96%) by supplying power to battery 10, the BMS 40 may end the charging mode. In addition, in the eco-friendly mode (ECO MODE), the BMS 40 enters a charging mode for supplying power to the battery 10 when the state of charge (SOC) reaches the second lower limit SOC (e.g., 30%). When a real-time state of charge (SOC) reaches the second upper limit SOC (e.g., 80%) by supplying power to battery 10, the BMS 40 may end the charging mode.

Slow charging and rapid charging are battery charging methods that are divided depending on the charging speed. The slow charging is a slow charging method for completing the charging of the battery 10 after exceeding a predetermined reference time. The rapid charging is a fast charging method for completing the charging of the battery 10 within a predetermined reference time.

In the meantime, when using the battery at a maximum capacity, e.g., when the first lower limit SOC (e.g., 2%) and the first upper limit SOC (e.g., 96%) are repeatedly used, or when using an extended battery capacity (1% to 97% or 0% to 99%), aging of the battery 10 may be accelerated. In addition, when the battery 10 is charged by the rapid charging method, the aging of the battery 10 may be accelerated compared to when the battery 10 is charged by the slow charging method.

As the battery 10 ages with use after being manufactured, a total amount of storable energy (battery capacity) also decreases. A state of health (SOH) is a performance index that is obtained by comparing an ideal battery state with a current battery state. For example, although the battery 10 initially had a battery capacity of 1000 mAh, the battery capacity may decrease to 850 mAh after use for a predetermined period of time. Then, the battery state of health (SOH) becomes 85%.

For reference, when the battery state of health (SOH) is 100%, states of charge (SOC) at the time of full charge and full discharge of the battery 10 are 100% and 0%, respectively. In addition, when the battery state of health (SOH) is 85%, the states of charge (SOC) at the time of full charge and full discharge of the battery 10 are 100% and 0%, respectively. That is, the state of charge (SOC) is 100% when the energy that can be filled in the battery 10 is fully filled, and is 0% when the energy is exhausted, regardless of the state of health (SOH) of the battery. However, the battery 10 with a battery state of health (SOH) of 100% can supply a total of 1000 mAh of energy after being fully charged, whereas the battery 10 with a battery state of health (SOH) of 85% can only supply a total of 850 mAh energy after being fully charged.

That is, the battery capacity decreases in response to the battery state of health (SOH). For example, a time when the battery state of health (SOH) is decreased to a predetermined reference value, e.g., 80%, may be regarded as a battery replacement time. When the battery state of health (SOH) falls below 80%, the battery capacity is rapidly deteriorated and the battery 10 cannot perform its original role.

Figure 2A:
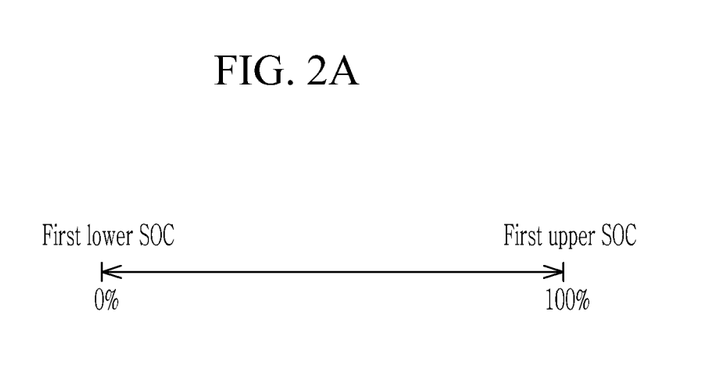
FIGS. 2A and 2B illustrate views for describing a normal mode according to an embodiment.
Figure 2B:
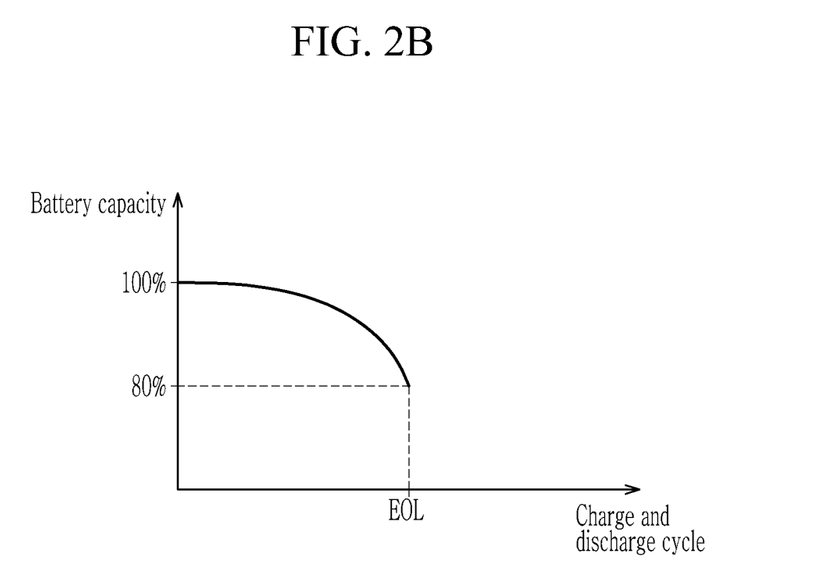
Figure 3A:
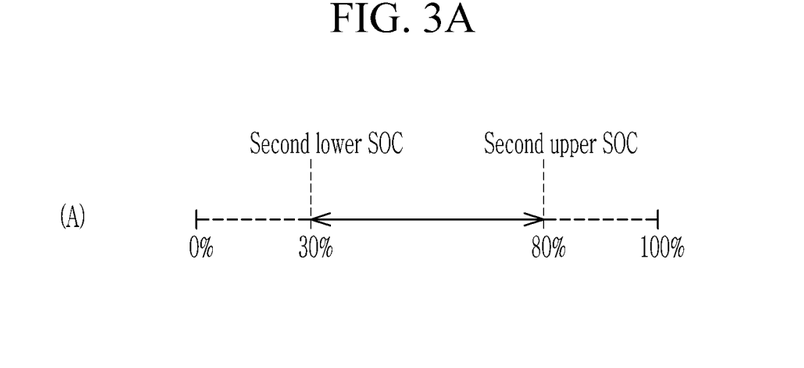
FIGS. 3A and 3B illustrate views for describing an eco-friendly mode according to an embodiment.
Figure 3B:
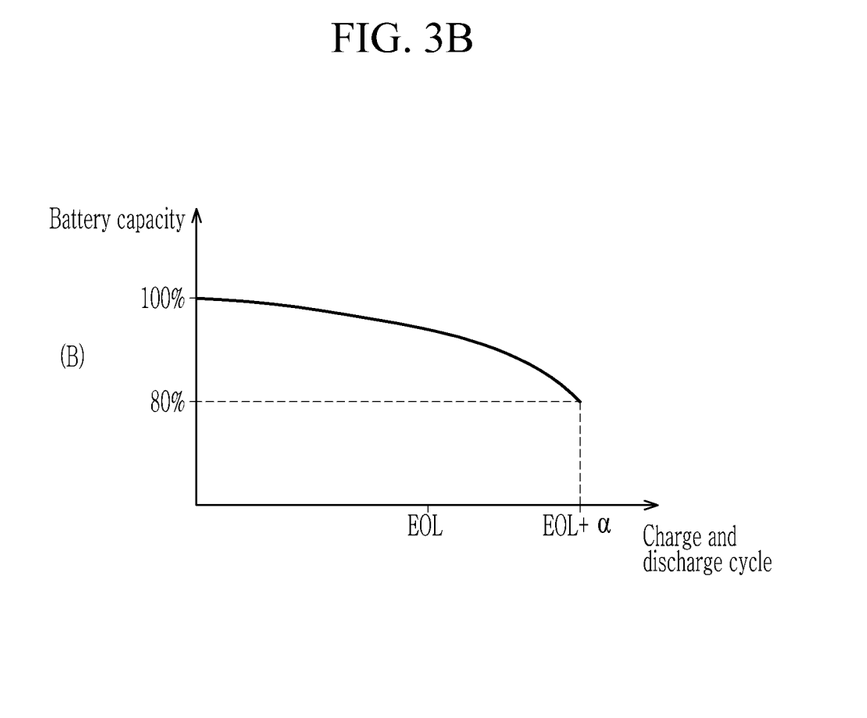

FIGS. 2A and 2B illustrate views for describing a normal mode according to an embodiment, and FIGS. 3A and 3B illustrate views for describing an eco-friendly mode according to an embodiment.

According to an embodiment, a first key Key_1 for executing the eco-friendly mode (ECO MODE) may be provided on a user interface. When a user selects (ON) or non-selects (OFF), the first key Key_1 that performs the eco-friendly mode (ECO MODE), the BMS 40 may control the charging of the battery 10 in the eco-friendly mode (ECO MODE) depending on user selection (ON) or the normal mode (NORMAL MODE) depending on non-selection (OFF). For example, the BMS 40 may receive a first key-on signal for selecting the first key Key_1 or a first key-off signal for not selecting the first key Key_1 from an electronic control unit (ECU).

According to another embodiment, the first key Key_1 for executing the eco-friendly mode (ECO MODE) and a second key Key_2 for executing the normal mode (NORMAL MODE), which can be manipulated by the user, may be provided in a user interface. When the user selects (ON) of the first key Key_1 for executing the eco-friendly mode (ECO MODE), the BMS 40 may control the charging of the battery 10 in the eco-friendly mode (ECO MODE). When the user selects (ON) of the second key Key_2 for executing the normal mode (NORMAL MODE), the BMS 40 may control the charging of the battery 10 in the normal mode (NORMAL MODE). For example, the BMS 40 may receive the first key-on signal for selecting the first key Key_1 or a second key-on signal for selecting the second key Key_2 of the normal mode (NORMAL MODE) from the electronic control unit (ECU).

Referring to FIG. 2A, in an ON state of the normal mode (NORMAL MODE), the first battery capacity is set to a usable battery capacity (hereinafter, the available battery capacity), and rapid charging is enabled. Accordingly, the BMS 40 may control the charging of the battery 10 in a first battery capacity range by the fast charging or slow charging method depending on the user selection.

Referring to FIG. 2B, when the battery 10 is used and managed in the normal mode (NORMAL MODE), an end of life (EOL) of the battery 10 may be determined as a time when the available battery capacity reaches a predetermined reference value (80%) compared to an initial state (100%). That is, when the battery state of health (SOH) reaches 80%, the battery 10 should be discarded. In this case, the end of life (EOL) may be determined depending on a number of charge and discharge cycles. For example, a lithium-ion battery is determined to have reached the end of life (EOL) when 300 to 500 charge and discharge cycles have elapsed.

Referring to FIG. 3A, in the ON state of the eco-friendly mode (ECO MODE), the second battery capacity is set to an available battery capacity, and the fast charging method is disabled. Accordingly, the BMS 40 may control the charging of the battery 10 in a second battery capacity range by the slow charging method. In this case, the second battery capacity may be set to a battery capacity in a range that is smaller than the first battery capacity.

Referring to FIG. 3B, when the battery 10 is used and managed in the eco-friendly mode (ECO MODE), an end of life (EOL+α) of the battery 10 may be extended for a predetermined period of time a than when the battery 10 is used and managed in the normal mode (NORMAL MODE).

Figure 4:
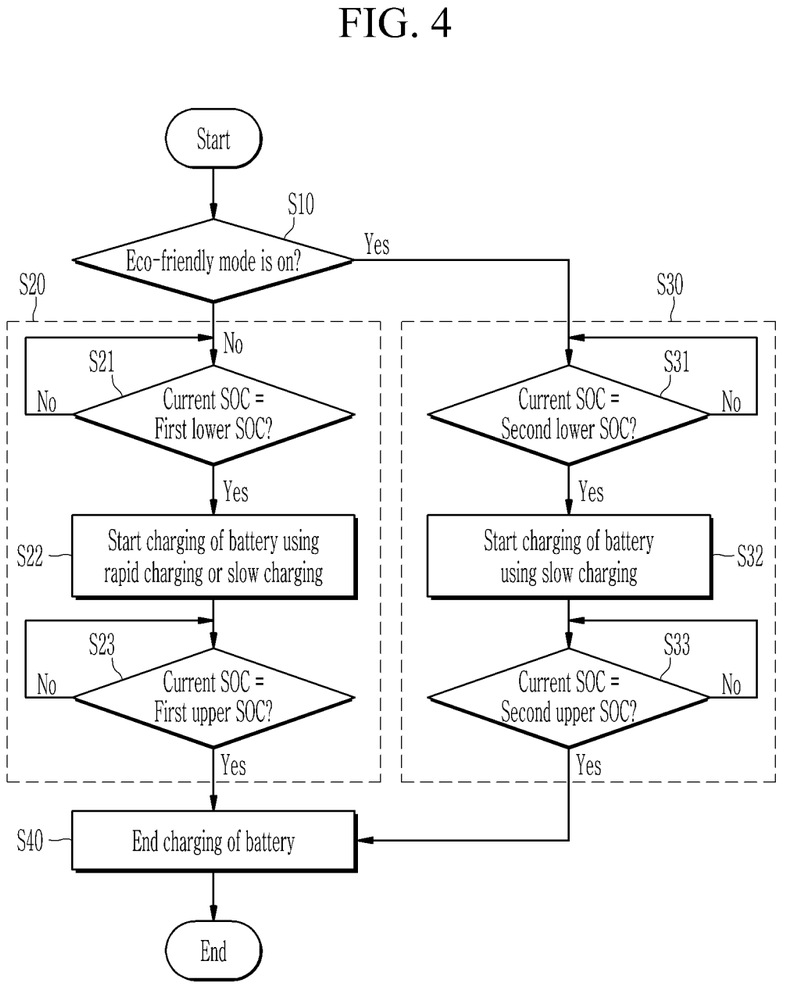
FIG. 4 illustrates a flowchart describing a method of extending cycle-life of a battery by charging the battery in a normal mode or an eco-friendly mode depending on user selection according to an embodiment.

FIG. 4 illustrates a flowchart describing a method of extending cycle-life of a battery by charging the battery in a normal mode or an eco-friendly mode depending on user selection according to an embodiment.

Hereinafter, a battery management method and a battery system providing the method will be described with reference to FIG. 1 to FIG. 4.

Referring to FIG. 4, the BMS 40 determines whether the eco-friendly mode (ECO MODE) is in an on state by user selection (S10).

According to an embodiment, a first key Key_1, for executing the eco-friendly mode (ECO MODE) may be provided on a user interface (not illustrated). When a user selects the first key Key_1, the BMS 40 may determine the eco-friendly mode (ECO MODE), while when the user does not select the first key Key_1, the BMS 40 may determine the normal mode (NORMAL MODE). That is, when the user does not take any action, the BMS 40 may determine the normal mode (NORMAL MODE). For example, the BMS 40 may receive a first key-on signal for indicating selection of the first key Key_1 or a first key-off signal for indicating non-selection of the first key Key_1 from an electronic control unit (ECU).

According to another embodiment, the first key Key_1 for executing the eco-friendly mode (ECO MODE) and a second key Key_2 for executing the normal mode (NORMAL MODE) may be provided in a user interface. When the user selects the first key Key_1, the BMS 40 may determine the eco-friendly mode (ECO MODE), while when the user does not select the second key Key_2, the BMS 40 may determine the normal mode (NORMAL MODE). For example, the BMS 40 may receive the first key-on signal for selecting the first key Key_1 or a second key-on signal for selecting the second key Key_2 of the normal mode (NORMAL MODE) from the electronic control unit (ECU).

Next, when the eco-friendly mode (ECO MODE) is in an off state (S10, No), the BMS 40 controls the charging of the battery 10 in the normal mode (NORMAL MODE) (S20).

In step S20, first, the BMS 40 diagnoses whether a current state of charge (SOC) reaches a first lower limit SOC of the first battery capacity (S21).

The normal mode (NORMAL MODE) is a method of managing the battery 10 as designed. The normal mode (NORMAL MODE) uses the first battery capacity, which is a maximum battery capacity that is usable in the designed range. In this case, the first battery capacity may be a battery capacity having a range between a first lower limit SOC and a first upper limit SOC provided in a design and production process of the battery 10. Assuming an ideal state, the first battery capacity may include a battery capacity defined in a range between 0% and 100%. The BMS 40 may calculate the current state of charge (SOC) by estimating the state of charge (SOC) in a predetermined period or in real time.

In step S20, when the state of charge SOC reaches the first lower limit SOC (S21, Yes), the BMS 40 enters a charging mode for supplying power to the battery 10 (S22).

The BMS 40 may control the charging of the battery 10 in a first battery capacity range by the fast charging or slow charging method depending on the user selection. For example, when the user selects the rapid charging, the BMS 40 may control power to be supplied to the battery 10 through rapid charging.

According to an embodiment, when there is no user selection of the charging method, the BMS 40 may request the user to select the charging method through the electronic control unit (ECU). The electronic control unit (ECU) may control a message requesting selection of one of the fast charging and the slow charging method to be displayed on a user interface.

In step S20, the BMS 40 diagnoses whether a current state of charge (SOC) reaches a first upper limit SOC of the first battery capacity (S23).

In the charging mode, the battery 10 receives power from an external device, and the state of charge (SOC) increases as time elapses. For example, in the case where charging is started when the state of charge (SOC) is 0%, the state of charge (SOC) may gradually increase to 10%, 30%, or 50% as time elapses.

Next, when the eco-friendly mode (ECO MODE) is in an on state (S10, Yes), the BMS 40 controls the charging of the battery 10 in the eco-friendly mode (ECO MODE) (S30).

In step S30, first, the BMS 40 diagnoses whether the state of charge (SOC) reaches a second lower limit SOC of the second battery capacity (S31).

The eco-friendly mode (ECO MODE) is a battery management method for extending the cycle-life of the battery 10, and may be set by user selection. In the eco-friendly mode (ECO MODE), the second battery capacity, which is a battery capacity in a narrower region than that of the first battery capacity, is used. In this case, the second battery capacity may include a battery capacity having a range between a second lower limit SOC that is a predetermined magnitude that is greater than the first lower limit SOC and a second upper limit SOC that is a predetermined magnitude that is smaller than the first upper limit SOC. For example, the second battery capacity may include a battery capacity defined as a range between 30% and 80%.

Referring to FIG. 3A, the first lower limit SOC of the first battery capacity is smaller than the second lower limit SOC of the second battery capacity, and the first upper limit SOC is greater than the second upper limit SOC of the second battery capacity.

In step S30, when the state of charge SOC reaches the second lower limit SOC (S31, Yes), the BMS 40 enters a charging mode for supplying power to the battery 10 (S32).

Since the rapid charging method is disabled, the BMS 40 may control the charging of the battery 10 in the second battery capacity range by the slow charging method. When the state of charge (SOC) reaches the second lower limit SOC, e.g., 30%, the BMS 40 may control the battery 10 to be charged without further discharging.

In step S30, the BMS 40 diagnoses whether the state of charge (SOC) reaches the second upper limit SOC of the second battery capacity (S33).

Next, when the current state of charge (SOC) reaches the first upper limit SOC or the second upper limit SOC (S23, Yes), the BMS 40 may end the charging mode S40.

When the battery 10 is fully charged up to the first upper limit SOC, the BMS 40 may end charging of the battery 10 (S40). For example, the BMS 40 may end the charging of the battery 10 when the state of charge (SOC) reaches 100%.

When the battery 10 is fully charged up to the second upper limit SOC, the BMS 40 may end charging of the battery 10 (S40). For example, in the case where charging is started when the state of charge (SOC) is 30%, the state of charge (SOC) may gradually increase to 30% or 70% as time elapses. When the state of charge (SOC) reaches the second upper limit SOC, e.g., 80%, the BMS 40 may end the charging mode such that the battery 10 is no longer charged.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A battery system, comprising:
a battery; and
a battery management system (BMS) configured to control charging of the battery depending on a normal mode using a first battery capacity between a first lower limit state of charge (SOC) and a first upper limit SOC and an eco-friendly mode using a second battery capacity between a second lower limit SOC and a second upper limit SOC,
wherein the first lower limit SOC is smaller than the second lower limit SOC,
wherein the first upper limit SOC is greater than the second upper limit SOC, and
wherein the BMS:
calculates a current SOC by estimating a SOC of the battery every predetermined period,
in an on state of the eco-friendly mode, starts charging of the battery when the current SOC reaches the second lower limit SOC and ends the charging of the battery when the current SOC reaches the second upper limit SOC, and
in the on state of the eco-friendly mode, controls charging of the battery by using a slow charging method of charging the battery such that the current SOC reaches the second upper limit SOC after exceeding a predetermined reference time, the slow charging method being slower than a rapid charging method of the normal mode.

2. The battery system of claim 1, wherein the BMS:
in an on state of the normal mode, calculates the current SOC by estimating the SOC of the battery every predetermined period, and starts charging of the battery when the current SOC reaches the first lower limit SOC and ends the charging of the battery when the current SOC reaches the first upper limit SOC.

3. The battery system of claim 2, wherein the BMS:
in an on state of the normal mode, controls charging of the battery by using the rapid charging method of charging the battery such that the current SOC reaches the first upper limit SOC within the predetermined reference time or performs the slow charging method of charging the battery such that the current SOC reaches the first upper limit SOC after exceeding the predetermined reference time.

4. The battery system of claim 3, wherein the BMS:
in the on state of the normal mode, controls the charging of the battery by the rapid charging method or the slow charging method depending on driver selection.

5. The battery system of claim 1, wherein the BMS:
determines that the eco-friendly mode is in the on state when receiving a key-on signal of the eco-mode depending on driver selection, and
determines that the normal mode is in an on state when receiving a key-off signal of the eco-friendly mode depending on the driver selection.

6. The battery system of claim 1, wherein in the eco-friendly mode, the BMS controls the charging of the battery so that the battery is charged up to only the second upper limit SOC.

7. A battery management method for a battery management system (BMS) to manage a battery by controlling charging of the battery depending on a normal mode using a first battery capacity between a first lower limit state of charge (SOC) and a first upper limit SOC and an eco-friendly mode using a second battery capacity between a second lower limit SOC and a second upper limit SOC, the method comprising:
determining whether the eco-friendly mode (ECO MODE) is in an on state;
starting and controlling the charging of the battery when a current SOC that is estimated every predetermined period reaches the first lower limit SOC or the second lower limit SOC depending on a determination result thereof; and
ending the charging of the battery when the current SOC reaches the first upper limit SOC or the second upper limit SOC,
wherein the first lower limit SOC is smaller than the second lower limit SOC, and the first upper limit SOC is greater than the second upper limit SOC, the starting and controlling of the charging of the battery includes:
diagnosing whether or not the current SOC reaches the second lower limit SOC when the eco-friendly mode is in an on state as a result of the determination;
starting the charging of the battery by using a slow charging method of charging the battery such that the current SOC reaches the second upper limit SOC after exceeding a predetermined reference time when reaching it as a result of the diagnosis, the slow charging method being slower than a rapid charging method of the normal mode; and
diagnosing whether the current SOC reaches the second upper limit SOC.

8. The battery management method of claim 7, wherein the starting and controlling of the charging of the battery includes:
diagnosing whether or not the current SOC reaches the first lower limit SOC when the normal mode is in an on state as a result of the determination;
starting the charging of the battery by using the rapid charging method of charging the battery such that the current SOC reaches the first upper limit SOC within the predetermined reference time or the slow charging method of charging the battery such that the current SOC reaches the first upper limit SOC after exceeding the predetermined reference time when reaching it as a result of the diagnosis; and
diagnosing whether the current SOC reaches the first upper limit SOC.

9. The battery management method of claim 8, wherein the starting of the charging of the battery includes:
controlling the charging of the battery by the rapid charging method or the slow charging method depending on driver selection.

10. The battery management method of claim 7, wherein the determining of whether the eco-friendly mode (ECO MODE) is in the on state includes:
determining that the eco-friendly mode is in the on state when receiving a key-on signal of the eco-mode depending on driver selection, and determining that the normal mode is in an on state when receiving a key-off signal of the eco-friendly mode depending on the driver selection.

11. The battery management method of claim 7, wherein in the eco-friendly mode, the BMS controls the charging of the battery so that the battery is charged up to only the second upper limit SOC.

* * * * *